Sept. 15, 1931.        J. J. MAGNUSON        1,823,618
LUBRICATING TIP AND MEANS FOR EMPLOYING THE SAME
Filed Aug. 20, 1928
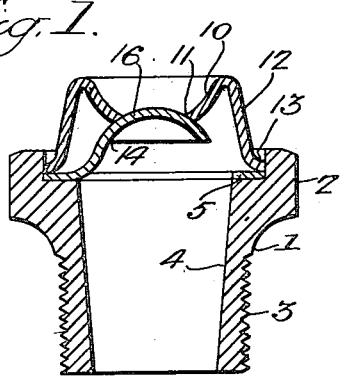
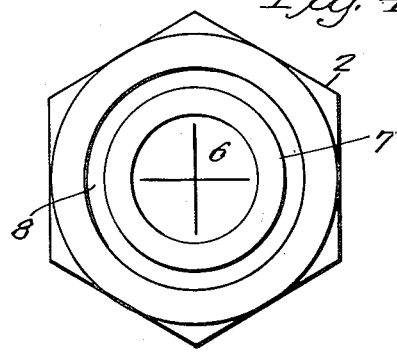
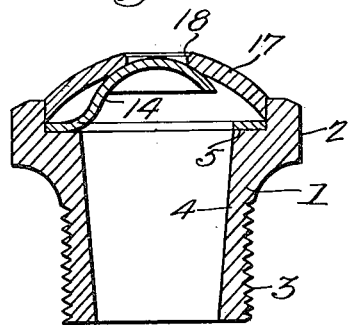
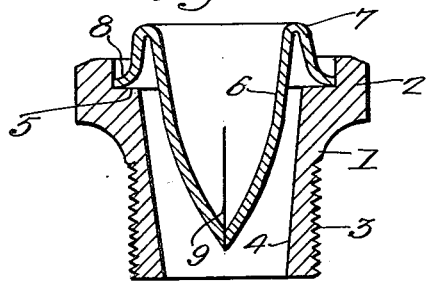
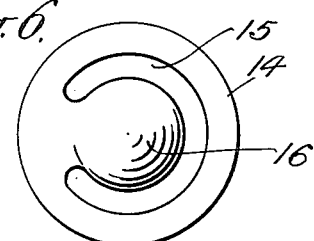
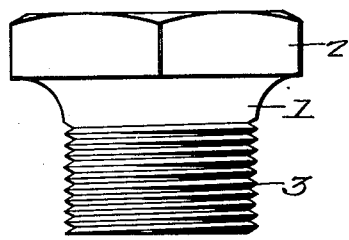
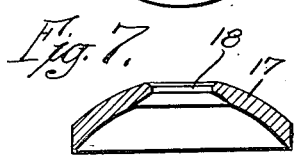
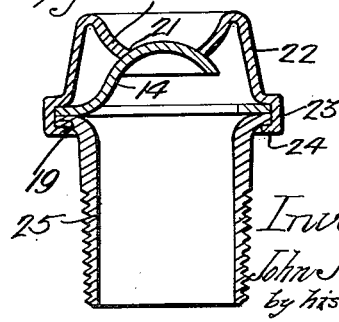
Inventor:
John J. Magnuson
by his Attorneys Patented Sept. 15, 1931

1,823,618

UNITED STATES PATENT OFFICE

JOHN JAMES MAGNUSON, OF WAYNESBORO, PENNSYLVANIA

LUBRICATING TIP AND MEANS FOR EMPLOYING THE SAME

Application filed August 20, 1928. Serial No. 300,759

This invention relates to lubricating tips for grease guns.

An object of the invention therefore is to provide a new and improved tip for grease guns.

Another object is to provide adapters to hold the new types of tips.

Another object is to provide a tip for lubricating grease guns, which will open inwardly when a lubricant is forced through, but which will close upon release of external pressure, to seal the lubricant within a suitable housing.

Other objects will hereinafter appear.

In the drawings:

Fig. 1 illustrates a vertical section through an adapter with one form of lubricating cup, together with one form of valve;

Fig. 2 shows the adapter and valve of Fig. 1 in conjunction with a modified form of cup;

Fig. 3 illustrates the adapter of Fig. 1 together with a combined cup and valve, designed for use with a high pressure lubricant feed;

Fig. 4 is a plan view of the assemblage shown in Fig. 3;

Fig. 5 is an elevation of the adapter;

Fig. 6 is a top plan of the valve of Figs. 1 and 2;

Fig. 7 is a vertical section through the cup of Fig. 2; while

Fig. 8 shows an assemblage employing a modified form of cup, and another form of adapter.

The adapter 1 shown in Figs. 1–5 comprises a hexagonal or other shaped head 2, provided with a threaded shank portion 3, adapted to be attached to the object to be lubricated. A channel 4 extends centrally through the adapter.

As will be seen, the channel 4 is widened adjacent its top to form the annular ledge 5. On this ledge rests the valve, and if one is employed, the valve cup.

One form of cup according to the invention, which is particularly adapted for high pressure work, is shown at 6 in Fig. 3. As will be seen, the cup 6 is substantially bullet-shaped, and is flared outwardly and downwardly at its upper end 7, the downwardly extending portion terminating in a flange 8. By this construction the cup is strengthened, and at the same time the use of grease guns with various forms of mouthpieces is permitted.

The lower end of the cup 6 has been slitted open in one or more places 9, thus forming lips. These lips have then been rolled or squeezed together, resulting in tight joints and assuring a certain degree of flexibility in the finger.

It will be readily seen that when a lubricant is injected under pressure, the lips must part and allow the lubricant to enter. As soon as the pressure is withdrawn, the tension in the lips, as well as "built up" pressure on the inside will cause the lips to close.

The cup may be threaded into the adapter, or as shown in the present instance the cup can be inserted in a counter-boring and "staked" over, or without departing from the essential features of the invention it can be inserted in any convenient manner, either with or without an adapter.

A substantially perfect seal against dust or grit is formed as a result of the grease filling the hollow part of the cup. Prior to refilling, the top layer of grease is wiped off, and the grease gun inserted.

In this manner a lubricating cup is produced which does not require a threaded hole nor close fit in order to form a tight joint between itself and the securing part.

In Fig. 1 is shown another form of lubricating cap, having a-cup-shaped central portion 10 which has a central opening 11 therein, the cup-shaped portion having outwardly flaring and downwardly extending ends 12, terminating in annular flanges 13. The cup may be secured to the adapters by any of the methods described with reference to the cup 6 of Figs. 3 and 4.

The cup 10 preferably employs the spring valve 14 of Figs. 1, 2, 6 and 8. As perhaps better shown in Fig. 6, this valve is made from flexible material cut into disc form, the centre of the disc being raised. A horseshoe-formed piece is then cut out from the disc, leaving part of a ring 15 at the bottom, and a dipper-like piece 16 extending from inside of said ring toward and around the centre. This centre portion forms the seat against the oil hole 11 of the cup 10, preventing dirt and grit entering inside of the seat.

This valve 14 when used with the cup 10 is tempered to be sensitive enough to "give" as a result of the pressure from a common "squirt" oil can, as well as to be strong enough to withstand the flow from a high pressure gun.

This cup is particularly adapted for use where thickness of the gearing material does not permit a cup of any considerable length, or one with a threaded stem. In the particular instance illustrated, it is necessary only to have a counterbore $\frac{7}{16}''$ in diameter by $\frac{1}{16}''$ deep, to secure the cup and valve.

Another form of lubricating cup 17 is shown in Fig. 7, which is particularly adapted for low pressure use, and is designed to meet the need of a cheap device. The cup, or cap in this form, is formed from a circular disc pressed concave, the convex side forming the top of said cap; a central opening 18 being formed in the cap to receive a valve, such as shown at 14.

When this form is employed as a low pressure oil cap, the device does not require "staking". It is merely inserted in position on the flange 5 of the adapter and struck lightly on its convex side with a light tool, the disc being spread out and enlarged in diameter, the valve and cap thus being secured in position. As will be readily understood, this form can also be employed without the use of an adapter.

When used as a high pressure device, "staking" or other forms of positively securing the cap must be employed, to prevent it from working out.

In Fig. 8 is shown a modification of the invention in which the adapter 25 is circular through the body, but terminates at its upper end in an outwardly flared flange 19 of hexagonal or other convenient shape. The valve 14 is seated on the flange 19, while the cap 20 comprises a central cup-shaped portion having an opening 21, and an outwardly and downwardly flaring rim 22, said rim terminating in a downwardly extending portion 23, from which is offset an inwardly extending flange 24. By means of the portion 23 and flange 24, it is possible to secure the cup and valve securely to the adapter 25.

As will be readily seen, the invention is susceptible to numerious modifications, and it is intended to be limited only by the scope of the appended claims.

I claim:—

1. In means for accommodating grease guns, an adapter to be secured to a casing surrounding parts to be lubricated and having a central opening therein, means defining an annular seat about said opening, a cap closing said opening, said cap having an arcuately curved central portion overlying the opening of the adapter and provided with an opening concentric with the opening of the adapter and having marginal portions seating upon said seat and spacing the central portion from said seat in the direction of the axis of the opening, a valve member closing the opening of the cap, said valve member having a ring-like portion interposed between the marginal portions of the cap and said seat, and means securing the cap to the seat.

2. In means for accommodating grease guns, an adapter to be secured to a casing surrounding parts to be lubricated and having a central opening therein, means defining an annular seat about said opening, a cap closing said opening, said cap having an arcuately curved central portion overlying the opening of the adapter and provided with an opening concentric with the opening of the adapter and having marginal portions seating upon said seat and spacing the central portion from said seat in the direction of the axis of the opening, a valve member closing the opening of the cap, said valve member having a ring-like portion interposed between the marginal portions of the cap and said seat, and means securing the cap to the seat, said valve further including a resilient neck whereby it is integrally connected with said ring-like portion.

3. In means for accommodating grease guns, an adapter comprising a body adapted to be secured in the opening formed in the casing surrounding said adapter having a central opening formed therein, means defining an annular seat at the outer end of the opening, an upstanding flange surrounding said seat, a cap having a central portion and marginal portions offset axially of the cap from said central portion and seated upon the seat within the flange, said cap having a central opening, a valve comprising a marginal annulus interposed between the seat and the marginal portions of the cap, a valve portion for closing said opening and a neck connecting said annulus and valve portion, and means maintaining the cap in engagement with said annulus and said annulus in engagement with the seat.

JOHN JAMES MAGNUSON.